United States Patent

[11] 3,549,944

[72] Inventor Floyd M. Minks
Cambellsport, Wis.
[21] Appl. No. 527,866
[22] Filed Feb. 16, 1966
[45] Patented Dec. 22, 1970
[73] Assignee Brunswick Corporation
Chicago, Ill.
a corporation of Delaware. by mesne assignments

[54] TRIGGERED SUPPLY FOR ARC GAP UNIT
8 Claims, 3 Drawing Figs.
[52] U.S. Cl. .................................................. 315/209,
315/214, 315/218, 331/111, 331/112
[51] Int. Cl. ........................................................ H05b 37/02,
H05b 39/04
[50] Field of Search ........................................ 315/209M,
209SCR, 209, 218; 331/111, 112

[56] References Cited
UNITED STATES PATENTS
3,316,448 4/1967 Hardin et al. ................. 315/209

| | | | |
|---|---|---|---|
| 3,277,340 | 10/1966 | Jukes et al. .................. | 315/214 |
| 3,219,877 | 11/1965 | Konopa ....................... | 315/209 |
| 3,187,222 | 6/1965 | Quinn .......................... | 315/209 |
| 3,312,211 | 4/1967 | Boyer .......................... | 123/148 |
| 3,409,801 | 11/1968 | Bruijning et al. ............. | 315/209 |

Primary Examiner—John W. Huckert
Assistant Examiner—B. Estrin
Attorney—Andrus, Sceales, Starke & Sawall ABSTRACT: This disclosure includes a capacitor discharge ignition system having a triggered blocking oscillator connected to charge a capacitor. A gated oscillator is connected to fire the triggered oscillator. The gated oscillator includes three windings wound one on each of the three legs of an E-shaped core. A rod of ferrite rotates to selectively bridge the gap between the legs and couple two of the windings for producing a pulse to trigger the triggered blocking oscillator. The gated oscillator includes a negative feedback winding to positively hold the gated oscillator off with the rod spaced from the legs.

PATENTED DEC 22 1970 3,549,944

INVENTOR
FLOYD M. MINKS
BY
Andrus & Starke
Attorneys

TRIGGERED SUPPLY FOR ARC GAP UNIT

ARC FORMING CIRCUIT

This invention relates to an arc-forming circuit and particularly to a capacitor discharge system for generating an electric arc.

In the formation of arcs for igniting a gas or the like such as internal-combustion engines and the like, a highly improved arcing characteristic can be obtained by charging a capacitor and then discharging of the capacitor into the gap. A particularly advantageous method of discharging of the capacitor employs a silicon controlled rectifier or the like connected in series with the capacitor and the output circuit means such as a pulse transformer. The capacitor is of course also connected in a charging circuit which charges the capacitor during the period that the silicon controlled rectifier is turned off. The silicon controlled rectifier will normally maintain an effective open output circuit or discharging circuit. However, when an appropriate input signal is applied to the gate, the silicon controlled rectifier conducts and effectively provides a low time constant discharge circuit for the capacitor.

Although many switching circuits can be employed to fire the silicon controlled rectifier, it is often desirable to include a contactorless system and the present invention is particularly directed to a simple and inexpensive contactorless system for providing accurate firing of the silicon controlled rectifier.

Generally, in accordance with the present invention, a gated oscillator is provided having a magnetic coupling control member forming a part thereof to turn the oscillator on and off. The oscillator includes an output winding connected through a suitable coupling circuit to the gate of the silicon controlled rectifier or similar pulse responsive switch means. The magnetic coupling control member is rotated by any suitable means to provide the desired sequential firing of the silicon controlled rectifier and therefore the discharging of the capacitor.

The gated oscillator in accordance with one important aspect of the present invention includes three windings wound on each of the three legs of an E-shaped core. The winding on the center leg is connected as the charging winding. The winding on a first outer leg is connected as the feedback winding and the winding on the opposite leg is connected in series with the feedback winding on the opposite leg is connected in series with the feedback winding to provide a bias and balance winding. The output is taken from the above windings on the core or a separate output winding can be wound on the cores. A rod of ferrite or similar material is movably mounted to selectively bridge the gap between the center leg and the outer leg carrying the feedback winding. In operation, the rod periodically is moved into alignment and misalignment with the legs to alternately provide a low reluctance magnetic path and a high reluctance magnetic path. In this manner, the coupling between the charging winding and the feedback winding is periodically increased. Normally, the windings on the outer leg provide a balanced condition and no output appears across the output winding. However, when the ferrite rod is aligned with the legs, the balanced condition is upset, feedback is established and the circuit oscillates producing an output signal which is transmitted through a suitable coupling circuit to trigger the silicon controlled rectifier.

The balance winding may also be connected in series with the charging winding to produce a negative or turn-off signal in the feedback winding.

The present invention thus provides a very simple and inexpensive means for providing accurate control of a gap or arc forming device without the necessity of employing contact breaker points or other similar switching means.

The drawings furnished herewith illustrate preferred constructions of the present invention in which the above advantages and features are clearly disclosed as well as others which will be clear from the following description.

Figure 1:
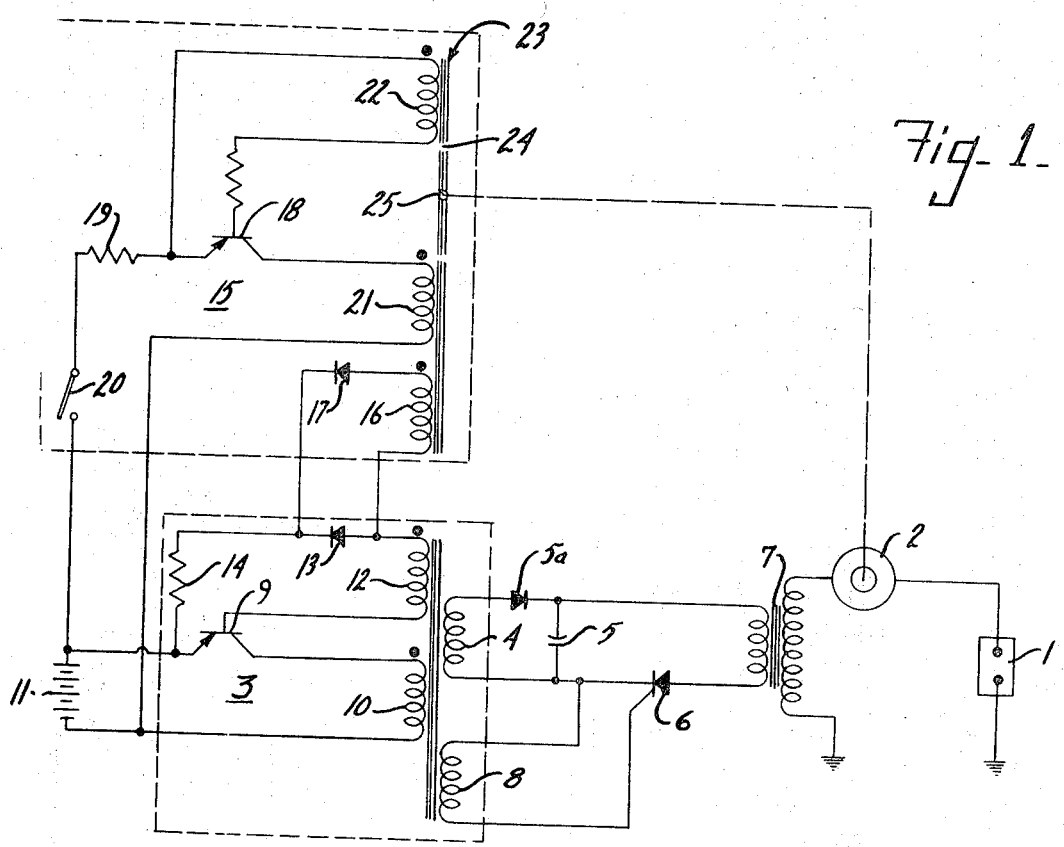
FIG. 1 is a schematic circuit diagram of an arc forming circuit constructed in accordance with the present invention.

Referring to the drawings and particularly to FIG. 1, the illustrated embodiment of the invention may be an ignition system for an internal-combustion engine, not shown, having a spark gap unit 1 for firing of the engine. Although a single gap unit 1 is shown, the engine may include a plurality of units connected to be sequentially fired through a suitable distributor 2. A triggered oscillator 3 has a first output winding 4 connected to charge a capacitor 5 which is connected in a discharge circuit including a silicon controlled rectifier 6 and a pulse transformer 7 for supplying the energy to the spark gap unit 1 through distributor 2. The triggered oscillator 3 also includes a second output winding 8 connected to fire the silicon controlled rectifier 6 for discharging of the capacitor 5.

The triggered oscillator 3 includes a transistor 9 having an emitter to collector loop including a charging winding 10 connected to a battery 11. A feedback winding 12 is connected in the emitter to base loop of a transistor 9 in a series circuit including a diode 13 and a resistor 14. The diode 13 is polarized to conduct turn-on current to the transistor 9.

In accordance with the present invention, the triggered oscillator 3 is controlled or turned on by a gated oscillator 15 which includes an output winding 16 connected in series with a diode 17 across the diode 13 and polarized to also conduct turn-on current to the transistor 9 of the triggered oscillator 3. The gated oscillator 15 includes a rotating coupling control member coupled to a timing means such as the engine distributor when applied to an internal-combustion engine for proper timed operation of the gated oscillator and therefore establishment of an output signal at winding 16.

The illustrated gated oscillator 15 includes a transistor 18 having an emitter to collector loop connected to the battery 11 in series with a resistor 19, a control switch 20 and a charging winding 21 which is magnetically coupled to a feedback winding 22 and to output winding 16. The magnetic coupling is diagrammatically shown including a core unit 23 with a gap 24 alternately magnetically opened and closed by a rotating magnetic armature 25 which is rotatably mounted within the gap. Any other method of coupling or decoupling the windings or of charging the losses associated with the windings may be substituted for the system shown in FIG. 1. The illustrated armature 25 is a rectangular member having a major length generally corresponding to the gap length and a minor length or width which is substantially shorter than the gap length. When the major length of the armature 25 is aligned with the gap, the winding 21 is close coupled to the feedback winding 22 to produce oscillations. When the minor length is aligned with the gap, the increased gap length decouples the windings 21 and 22 and oscillations cease.

The output signal from winding 16 is applied across the diode 13 and produces a turn-on signal to the transistor 9 of the triggered oscillator 3. The triggered oscillator 3 completes a cycle of operation including a core charging portion and core discharging portion. The capacitor 5 is charged during the discharging portion. During the initial charging portion, an output signal is generated in the second output winding 8 which fires the silicon controlled rectifier 6 and causes rapid discharge of the previously charged capacitor. After the capacitor 5 is discharged, the silicon controlled rectifier 6 reverts to the cutoff state and maintains the discharging circuit effectively opened. As a result, the capacitor 5 is again charged during the discharging portion of the cycle of the triggered oscillator 3.

The rotation of the armature 25 therefore generates a series of time spaced pulse signals having a period related to the rotation of distributor 2. Each signal triggers the triggered oscillator 3 which in turn sequentially fires silicon controlled rectifier 6 to discharge capacitor 5 and then again charges capacitor 5.

The gated oscillator 15 provides a reliable and relatively simple contactorless switching means for actuating the circuit.

Figure 2:
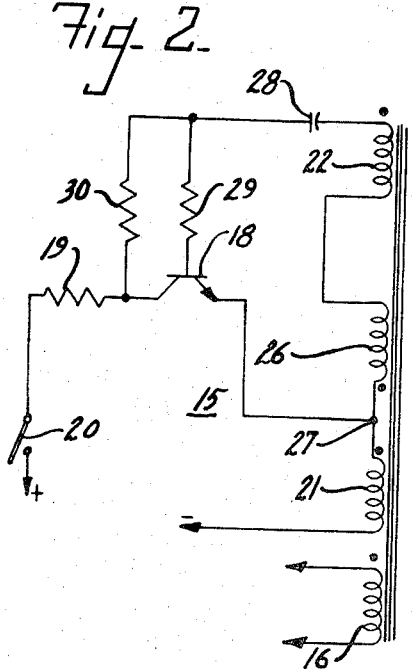
FIG. 2 is a schematic circuit diagram of an alternate winding arrangement for a gated oscillator.
Figure 3:
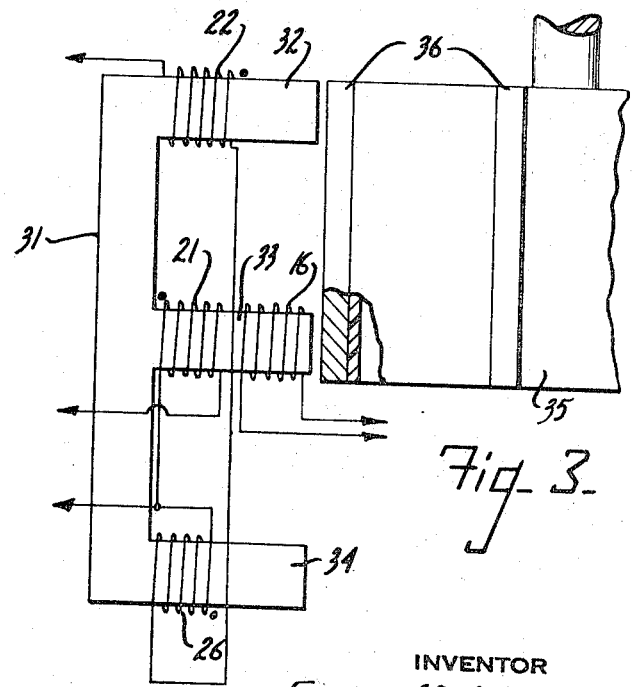
FIG. 3 is a diagrammatic view of the winding and core construction for the gated oscillator shown in FIG. 2.

Referring particularly to FIGS. 2 and 3, a gated oscillator is shown having a balanced winding and core arrangement. The corresponding elements of FIGS. 1 and 2 are similarly numbered for simplicity and clarity of explanation. The opposing nature of the winding permits proper operation of the circuit over a much wider range of parameters, such as gain of transistor 18 which is possible with the winding arrangement for the gated oscillator 15 of FIG. 1. The specific selection and balancing of the components is thereby eliminated.

In FIG. 2, a balance or decoupling winding 26 is connected in series between the feedback winding 22 and the emitter of transistor 18. The transistor 18 of FIG. 2 is an NPN transistor having the collector tied to the positive side of the battery and the emitter also tied to the charging winding. The feedback or coupling winding 22 is connected to winding 26 and at the opposite end to a capacitor 28 which is connected in series with a resistor 29 to the base of the transistor 18. A resistor 30 is connected between the collector and the junction of resistor 29 and capacitor 28.

The core structure and arrangement of the windings of FIG. 2 are shown in FIG. 3.

The core assembly includes an E-shaped core 31 mounted in generally fixed relation defining three legs 32, 33 and 34. The charging winding 21 and the output winding 16 of the gated oscillator 15 are wound on the central leg 33. The coupling winding 22 is connected on the one outer leg 32 and the decoupling winding 26 is connected on the opposite outer leg 34. A rotating drum 35 is rotatably mounted with its periphery spanning the central leg 33 and the feedback leg 32. A plurality of ferrite rods 36 are secured to the periphery to bridge the ends of legs 32 and 33. When a ferrite rod 36 is aligned with the leg 32 and leg 33, the coupling therebetween is increased and produces a positive feedback signal to turn the oscillator on and produce an output signal in the winding 16 as in FIG. 1.

When no ferrite rod 36 is aligned with the legs 32 and 33, the magnetic path from the center leg 33 and each outer leg 32 and 34 is identical and any flux from the charging winding 21 is equally divided between the legs 32 and 34. The windings 21 and 22 balance and produce a net zero signal in the base-emitter loop of the transistor 18. Consequently, the gated oscillator 15 turns off and removes the firing signal from the triggered oscillator 3 until the subsequent time when a ferrite rod 36 is again aligned with the two legs 32 and 33. In this manner, the gated oscillator 15 is turned on and off to produce timed spaced firing signals to the triggered oscillator 3 and thereby provides a sequential discharging and charging of the capacitor 5 as in FIG. 1.

Further, if desired, the number of turns in the balance winding 26 can be made greater than the number of turns in the feedback winding 22. When the ferrite rod 36 moves from alignment with the legs 32 and 33 to reduce the coupling between the charging winding 21 and the feedback winding 22, a slight net negative signal is generated in the base to emitter loop of the transistor 18 to positively prevent turn-on of the oscillator 15.

The operation of the embodiment of the invention of FIG. 2 is similar to FIG. 1 and is briefly summarized as follows. The drum 35 is driven to sequentially align ferrite cores 36 with the legs 32 and 33 to sequentially increase and decrease the coupling of the charging winding 21 and the feedback winding 22. This periodically turns the oscillator 15 on and off. The output winding 16 periodically establishes a suitable signal to the triggered oscillator 3 and initiates a cycle. During the charging cycle of the oscillator 3, a firing pulse is formed in the output winding 8 to fire the silicon controlled rectifier 6 and discharge the capacitor 5. During this period, energy is stored in the core of the oscillator 3 as a result of the blocking diode 5a which prevents transfer of energy during this portion of the oscillator cycle. At the end of the charging cycle, the potentials reverse and the output winding 4 transfers the energy to the capacitor 5 to again charge the capacitor 5 to the desired value.

In this manner, a timed formation of an arc in the spark gap is provided without the requirement of any opening and closing of suitable contacts.

Various modes of carrying out the invention are contemplated as being within the scope of the following claims particularly pointing out and distinctly claiming the subject matter which is regarded as the invention.

I claim:

1. An energy discharge system for supplying energy to an arc gap unit, comprising:
   means to store energy;
   a discharging circuit having a triggered means including said means to store energy and means for connection to an arc gap unit for discharging of the stored energy to the gap unit; and
   a gated oscillator having an output means connected to the triggered means and having a movable control means connected to turn the oscillator on and off and thereby control the firing of the triggered means, said gated oscillator having a net negative feedback means connected to positively hold said oscillator completely off with said control means positioned to turn said gated oscillator off.

2. The energy discharge system of claim wherein said means to store energy includes a storage capacitor.

3. The energy discharge system of claim 1 wherein said means to store energy includes a triggered blocking oscillator connected in a charging circuit with a storage capacitor and said triggered blocking oscillator being connected to said gated oscillator and periodically turned on by the on and off operation of said gated oscillator, said triggered oscillator including an energy storage inductor and having an inductor and an operating cycle including a charging portion to store energy in the inductor and an inductor discharging portion transferring said stored energy to said capacitor, and discharge control means energized in synchronism with the initiation of said charging portion to rapidly discharge the storage capacitor during the initial portion of the charging.

4. The energy discharge system of claim 3 wherein said triggered oscillator means includes an output winding connected to the discharge control means of the triggered means and establishes a firing signal to the discharge control means when the triggered oscillator is turned on.

5. The energy discharge system of claim 1 wherein said gated oscillator includes a charging winding connected in a charging circuit with said storage means, a coupling feedback winding providing positive feedback and a decoupling feedback winding providing negative feedback and said feedback winding being connected in said charging circuit to control oscillation of the oscillator, all of said windings being wound on a core with the coupling winding and the decoupling winding connected in series and the charging winding produces magnetic linkage with the coupling winding and the decoupling winding, and a magnetic member movable with respect to said windings to periodically change the magnetic linkage between the charging winding and the coupling winding to turn the oscillator on and off.

6. The energy discharge system of claim 5 wherein said core is a three-legged core having the charging winding on the center leg and the coupling feedback winding on a first outer leg and the decoupling winding on the second outer leg and said magnetic member is periodically positioned to bridge the ends of the legs between the center leg and the first outer leg.

7. The energy discharge system of claim 5 wherein said decoupling winding and coupling winding being arranged and constructed to produce a net negative signal in the coupling feedback winding with the magnetic member located to turn the oscillator off.

8. The energy discharge system of claim 5 wherein said core is an E-shaped core having the charging winding of the central leg, the coupling winding on one outer leg and the decoupling winding on the opposite outer leg.

UNITED STATES PATENT OFFICE
CERTIFICATE OF CORRECTION

Patent No. 3,549,944      Dated December 22, 1970

Inventor(s) FLOYD M. MINKS

It is certified that error appears in the above-identified patent and that said Letters Patent are hereby corrected as shown below:

Column 1, Line 44,    cancel "on the opposite leg is connected in se-"
          and Line 45,    cancel "ries with the feedback winding"
    (See application-
    Page 2, Line 9)

Column 2, Line 44,    cancel "charging" and insert --- changing ---
    (See application -
    Page 4, Line 19)

Column 4, Line 70,    cancel "of" and insert --- on ---
    (See application -
    Claim 8, Line 2)

Signed and sealed this 27th day of April 1971.

(SEAL)
Attest:

EDWARD M. FLETCHER, JR.    WILLIAM E. SCHUYLER, JR.
Attesting Officer           Commissioner of Patents